United States Patent
Yeazel et al.

(10) Patent No.: US 7,841,364 B2
(45) Date of Patent: Nov. 30, 2010

(54) DOUBLE BLOCK AND BLEED PLUG

(75) Inventors: Kenneth L. Yeazel, Tulsa, OK (US);
Gregory L. Puckett, Broken Arrow, OK
(US); Richard L. Goswick, Tulsa, OK
(US)

(73) Assignee: TDW Delaware, Inc., Wilmington, DE
(US)

( * ) Notice: Subject to any disclaimer, the term of this
patent is extended or adjusted under 35
U.S.C. 154(b) by 43 days.

(21) Appl. No.: 11/936,182

(22) Filed: Nov. 7, 2007

(65) Prior Publication Data

US 2009/0114301 A1 May 7, 2009

(51) Int. Cl.
*F16L 55/11* (2006.01)
(52) U.S. Cl. .............................. 138/92; 138/89; 138/90;
138/91; 138/94
(58) Field of Classification Search .................. 138/89,
138/90, 91, 92, 94, 95
See application file for complete search history.

(56) References Cited

U.S. PATENT DOCUMENTS

| | | | |
|---|---|---|---|
| 386,446 A | | 7/1888 | Bailey |
| 411,978 A | | 10/1889 | Chisholm |
| 789,620 A | * | 5/1905 | Mason ........................ 138/91 |
| 888,146 A | * | 5/1908 | Deasy ......................... 138/89 |
| 1,181,984 A | | 5/1916 | Arni |
| 1,221,733 A | | 4/1917 | Henderson |
| 1,966,819 A | * | 7/1934 | Irvin ............................. 137/1 |
| 1,993,307 A | * | 3/1935 | Nicholson .................... 138/89 |
| 2,177,916 A | * | 10/1939 | Thomas et al. ................ 138/90 |
| 2,279,257 A | | 4/1942 | Svirsky |
| 2,299,434 A | * | 10/1942 | Svirsky ....................... 138/90 |
| 2,812,778 A | | 11/1957 | Ver Nooy |
| 2,886,068 A | | 5/1959 | Ver Nooy |
| 2,906,295 A | | 9/1959 | Ver Nooy |
| 3,154,106 A | | 10/1964 | Ver Nooy |
| 3,442,294 A | | 5/1969 | Bischoff et al. |

(Continued)

FOREIGN PATENT DOCUMENTS

EP 0 488 966 6/1992

OTHER PUBLICATIONS

International Search Report and Written Opinion (PCT/US08/81922); issued Jan. 21, 2009 by the International Search Authority (ISA/US); 10 pages.

(Continued)

*Primary Examiner*—James F Hook
(74) *Attorney, Agent, or Firm*—Gable Gotwals (57) ABSTRACT

A pipe plug comprised of two, pivotally connected plugging heads, each plugging head having a sealing element, which work in combination to double block and bleed a pipe. The first sealing element prevents flow of product in the pipe and the second sealing element captures any leakage past the first sealing element and forces that leakage out through a fitting. A stabilization pad, connected to a flange on a nosepiece of each plugging head, prevents deformation of the sealing elements. A spring-loaded pivot arm connected to the second plugging head allows the yoke that connects the two plugging heads to rotate freely. An outward-facing raised taper projection on the pivot arm, along with a guide wheel connected to the first plugging head, prevent the yokes and plugging heads from becoming entrapped during their installation in or removal from the pipe.

8 Claims, 8 Drawing Sheets

U.S. PATENT DOCUMENTS

| | | | | |
|---|---|---|---|---|
| 3,495,546 | A | * | 2/1970 | Brown et al. ............... 104/155 |
| 3,626,475 | A | | 12/1971 | Hicks |
| 3,665,966 | A | | 5/1972 | Ver Nooy |
| 3,695,301 | A | * | 10/1972 | Pittman ..................... 138/97 |
| 3,774,646 | A | | 11/1973 | Smith |
| 3,774,647 | A | | 11/1973 | Saha et al. |
| 3,835,889 | A | * | 9/1974 | Hyde ........................ 138/93 |
| 3,902,528 | A | | 9/1975 | Tartabini et al. |
| 4,040,450 | A | | 8/1977 | Boundy |
| 4,057,081 | A | * | 11/1977 | Jones ........................ 138/97 |
| 4,064,912 | A | | 12/1977 | Petrone |
| 4,202,377 | A | | 5/1980 | Harrison |
| 4,314,577 | A | * | 2/1982 | Brister ....................... 137/13 |
| 4,422,477 | A | | 12/1983 | Wittman et al. |
| 4,505,295 | A | | 3/1985 | Quin et al. |
| 4,682,631 | A | | 7/1987 | Wilger et al. |
| 5,029,614 | A | | 7/1991 | Lara et al. |
| 5,082,026 | A | | 1/1992 | Smith |
| 5,156,042 | A | | 10/1992 | Carlin et al. |
| 5,293,903 | A | | 3/1994 | Friedrich |
| 5,297,581 | A | | 3/1994 | Godfrey |
| 5,531,250 | A | * | 7/1996 | Freeman et al. ............... 138/94 |
| 5,844,127 | A | | 12/1998 | Berube et al. |
| 5,924,454 | A | * | 7/1999 | Dyck et al. ................... 138/89 |
| 6,062,262 | A | | 5/2000 | Tash |
| 6,289,935 | B1 | | 9/2001 | Tash |
| 6,601,437 | B2 | | 8/2003 | Gotowick |
| 6,659,133 | B2 | | 12/2003 | Russell |
| 7,240,697 | B2 | | 7/2007 | Beebe et al. |
| 7,270,139 | B2 | | 9/2007 | Calkins et al. |
| 7,281,543 | B2 | | 10/2007 | Calkins et al. |
| 2007/0018452 | A1 | | 1/2007 | Lee |
| 2009/0114302 | A1 | * | 5/2009 | Yeazel et al. ................ 138/90 |

OTHER PUBLICATIONS

International Search Report and Written Opinion issued by the International Searching Authority (ISA/US) on May 28, 2009 in PCT/US09/38272 (11 pgs).

* cited by examiner

DOUBLE BLOCK AND BLEED PLUG

REFERENCE TO PENDING APPLICATIONS

This application is not based upon any pending domestic or international patent applications.

FIELD OF THE INVENTION

This invention relates generally to pipe plugs, particularly plugs for use in pipelines that carry high or low pressure fluids, high or low temperature fluids, steam, dangerous fluids, and environmentally hazardous fluids.

BACKGROUND OF THE INVENTION

"Double block and bleed" is a well-known term of art that refers to setting two seals in a pipe and opening a bleed port between the seals to ensure that the first seal is holding. Any leakage past the first seal is contained by the second seal and forced to exit through the bleed port. This arrangement ensures that the pipe is completely sealed, making it safe to work on downstream of the two seals.

Achieving double-block and bleed, however, currently requires the use of a single, metal-to-metal plugging seal or the use of two independent pluggers and fittings. Both approaches are expensive; use relatively large, heavy components; and require a lot of equipment to properly install. Additionally, the metal-to-metal plugging seal approach does not allow for bypassing pipeline product through a fitting. If a bypass is required, a second fitting must be installed upstream of the plugging seal. Therefore, a need exists for a double block and bleed plug that is less expensive, smaller and lighter weight, and easier to install than the current approaches. None of the prior art alone or in combination meets this need or renders the present invention obvious.

For additional information relating to pipe pluggers, reference may be had to the following previously issued United States patents.

| Patent Number | Inventor | Title |
| --- | --- | --- |
| 386,446 | Bailey | Apparatus For Detecting Leaks In Soil and Other Pipes |
| 411,978 | Chisholm | Pipe Stopper |
| 1,181,984 | Arni | Test Plug |
| 1,221,733 | Henderson | Test Plug |
| 2,279,257 | Svirsky | Expansible Closure Means For Conduits |
| 2,812,778 | Ver Nooy | Pipe Line Plugger |
| 2,886,068 | Ver Nooy | Pipe Line Plugger |
| 2,906,295 | Ver Nooy | Pipe Line Plugger |
| 3,154,106 | Ver Nooy | Pipeline Plugger |
| 3,442,294 | Bischoff et al. | Closure Means For Use During Pressure Testing Of Pipes or The Like |
| 3,665,966 | Ver Nooy | Pipe Plugger |
| 3,774,646 | Smith | Line Stopping Assembly Using An Inflatable Element |
| 3,774,647 | Saha et al. | Line Stopping Assembly Using An Inflatable Element |
| 3,902,528 | Tartabini et al. | Pneumatic Plug For Hydraulic Conduits |
| 4,040,450 | Boundy | Pipe Sealing Apparatus |
| 4,064,912 | Petrone | Gas Main Stopper |
| 4,202,377 | Harrison | Pipe Cleaning and Plugging Apparatus |
| 4,505,295 | Quin et al. | Apparatus For Inserting A Shut-Off Device Laterally Into A Pipe |
| 4,682,631 | Wilger et al. | Sealing Apparatus For A Valve Body Opening |
| 5,029,614 | Lara et al. | Tandem Seal System For Testing Pipelines |
| 5,082,026 | Smith | Pipeline Plugger |
| 5,297,581 | Godfrey | Pipeline Plugger |
| 5,844,127 | Berube et al. | Apparatus For Isolating or Testing A Pipe Segment |
| 6,062,262 | Tash | Water Drain Pipe Test Plug Device |
| 6,289,935 | Tash | Drainpipe Test Plug Device |
| 6,601,437 | Gotowik | Apparatus For Testing or Isolating A Segment Of Pipe |
| 6,659,133 | Russell | Insertable Line Stopper Plug For Pipelines |
| 7,240,697 | Beebe et al. | Apparatus and Method For Isolating and Testing A Segment Of Pipelines |
| 7,270,139 | Calkins et al. | Cam-Assisted, Wedge Actuated, Metal-to-Metal Seal, Block and Bleed Plugging Tool |
| 7,281,543 | Calkins et al. | Apparatus, Systems and Methods for Plugging a High Temperature Pipe |
| 2007/0018452 | Lee | Pipe Interruption Fitting |
| EP 0488966 A1 | Ravetti | Stopper Device For Gas Tubes |

BRIEF SUMMARY OF THE INVENTION

The pipe plug according to this invention comprises one plugging head with a sealing element pivotally connected by a yoke to a carrier, and a second plugging head with a sealing element pivotally connected by a yoke to the first plugging head. When lowered through a lateral pipe access connection and placed in a final sealing position within a pipe, the first sealing element prevents flow of product in the pipe and the second sealing element captures any leakage past the first sealing element and forces that leakage out through a fitting. The fitting may be connected to a sleeve welded around the pipe and located downstream of the pipe access connection. The sleeve is required only if the stabilization pad forces on the pipe are excessive.

To help position each sealing element within the pipe, the pipe plug includes a set of wheels connected to each plugging head. Each wheel in the set of wheels impinges a portion of the pipe at some point during positioning of the pipe plug within the pipe, thereby causing the sealing elements to rotate into their final sealing position within the pipe. A stabilization pad, connected to a flange on a nosepiece of each plugging head, prevents deformation of the sealing elements.

A spring-loaded pivot arm, pivot pin, and pivot wheel connected to the second plugging head allow the yoke that connects the two plugging heads to rotate freely into its proper position within a pipe. The pivot arm also has an outward-facing raised taper projection located behind the pivot wheel that helps prevent the pivot wheel from becoming entrapped in a pipe access connection when installing the pipe plug into the pipe or removing the pipe plug from the pipe. A guide wheel connected to the first plugging head helps prevent the first plugging head and the yoke connected to the carrier from becoming entrapped during the installation or removal process.

A better understanding of the invention will be obtained from the following detailed description of the preferred embodiments taken in conjunction with the drawings and the attached claims.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENTS

It is to be understood that the invention that is now to be described is not limited in its application to the details of the construction and arrangement of the parts illustrated in the accompanying drawings. The invention is capable of other embodiments and of being practiced or carried out in a variety of ways. The phraseology and terminology employed herein are for purposes of description and not limitation.

Figure 1:
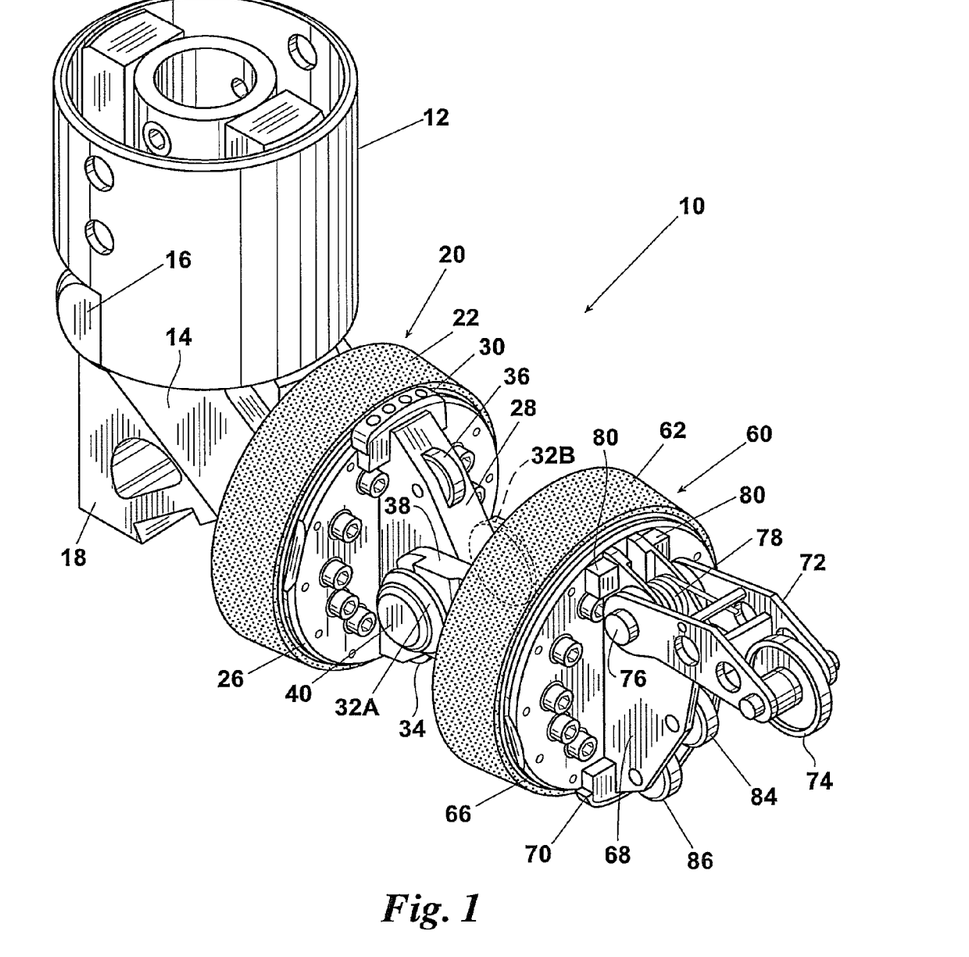
FIG. 1 is an isometric view of the pipe plug.
Figure 2:
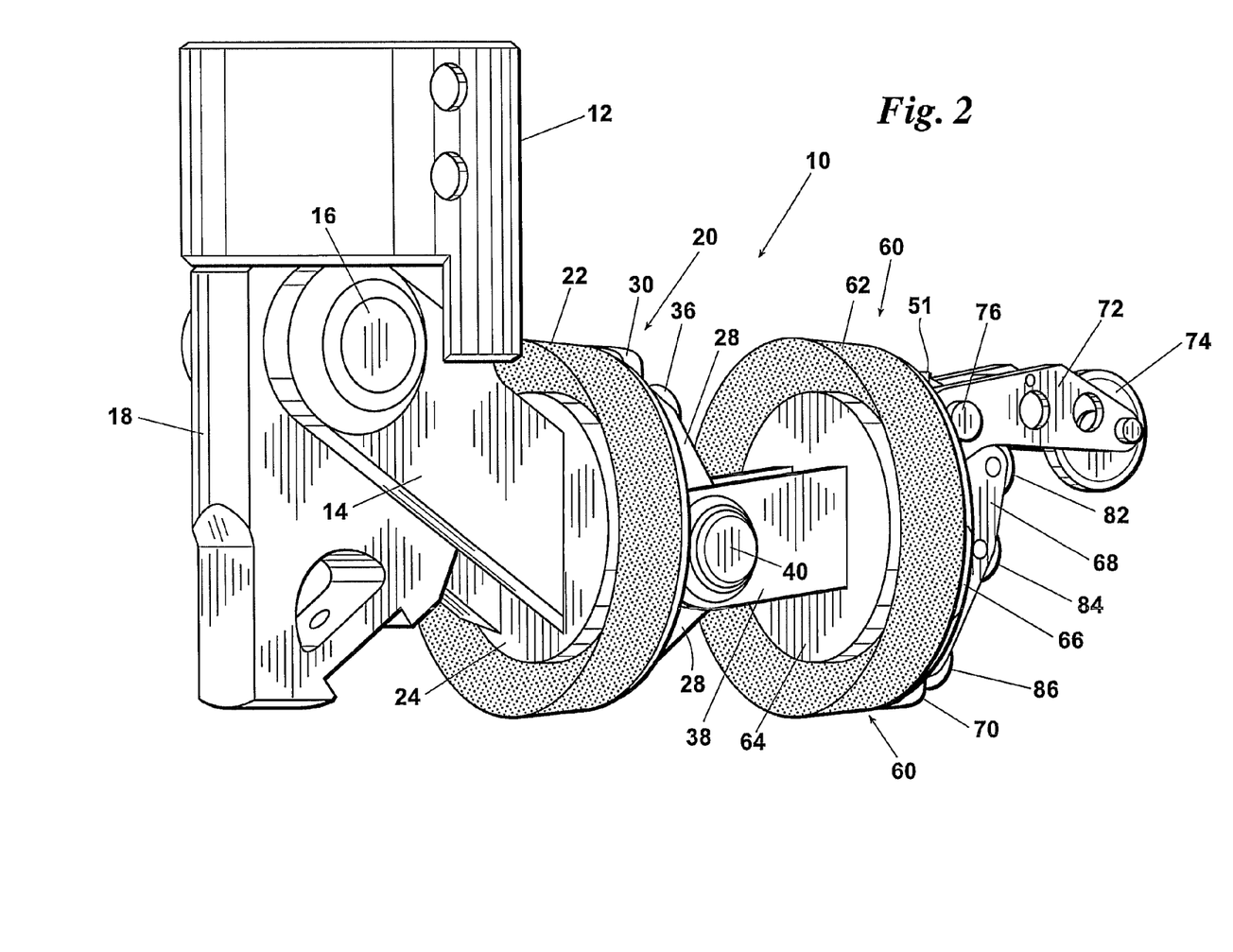
FIG. 2 is a reverse isometric view of the pipe plug.

Elements shown by the drawings are identified by the following numbers:

10 Pipe plug
12 Carrier
14 Yoke
16 Yoke Pin
18 Yoke Mount
19 Bottom of 18
20 Plugging Head
22 Sealing Element
24 Mounting Plate
26 Nosepiece
28 Flange
30 Stabilization Pad
32 Wheel
34 Wheel
36 Guide Wheel
38 Yoke
40 Yoke Pin
60 Plugging Head
62 Sealing Element
64 Mounting Plate
66 Nosepiece
68 Flange
70 Stabilization Pad
72 Pivot Arm
74 Pivot Arm Wheel
76 Pivot Arm Pin
78 Spring
80 Pivot Arm Stop
82 Wheel
84 Wheel
86 Wheel
90 Sleeve
92 Fitting
94 Bleed hole or opening Referring to the drawings and first to FIGS. 1 and 2, the pipe plug 10 comprises a plugging head 20 and a plugging head 60 that are pivotally connected to each other by a yoke 38 that rotates about a yoke pin 40. Plugging head 20, in turn, is pivotally connected to carrier 12 by yoke 14. Yoke 14 rotates about a yoke pin 16 contained within a yoke mount 18 connected to carrier 12. Carrier 12 is well-known in the art and is of the type of control bar head typically used to vertically lower, rotate, and position a plugging head within a pipe P for the purpose of temporarily blocking the pipe P. Similarly, plugging head 20 and plugging head 60 also are well-known in the art and are of the type typically used to temporarily block a pipe P.

Plugging head 20 includes a sealing element 22, a mounting plate 24, and a nosepiece 26 having a flange 28. A stabilization pad 30 mounts to flange 28 at a location substantially in line with yoke pin 16. Stabilization pad 30 helps prevent deformation of sealing element 22 by countering the rotational moment generated by seal force about yoke pin 16. Flange 28 also includes a guide wheel 36 that helps prevent yoke 14 and plugging head 20 from becoming entrapped in the access connection to pipe P during their installation into and removal from the pipe P.

Plugging head 60 includes a sealing element 62, a mounting plate 64, and a nosepiece 66 having a flange 68. To ensure that yoke 38 rotates freely into its proper position within the pipe P, a pivot arm 72 is rotationally affixed to flange 68. The pivot arm 72 includes a pivot wheel 74, pivot arm pin 76, and spring 78. The spring 78, along with two pivot arm stops 80 mounted to nosepiece 66, allows the pivot arm 72 to rotate outward and hold its position. Outward-facing projections on the pivot arm 72 and located substantially right behind pivot arm wheel 74 help prevent the pivot arm wheel 74 from becoming entangled in the access connection to pipe during installation of the second plugging head 60. A stabilization pad 70 mounts to flange 68 at a location substantially opposite that of pivot arm 72. Stabilization pad 70 helps prevent deformation of sealing element 62 by countering the rotational moment generated by seal force about yoke pin 40.

Figure 3:
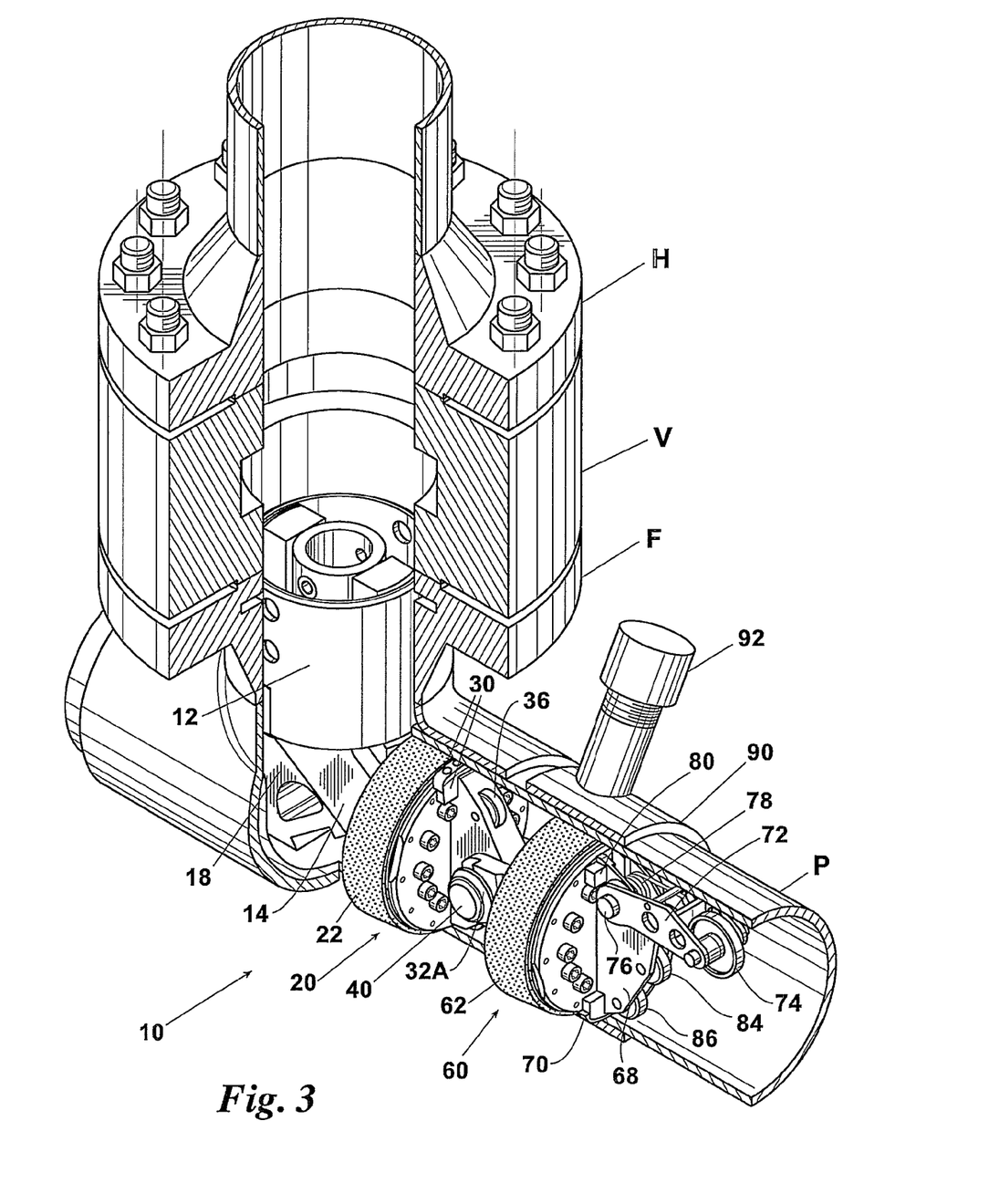
FIG. 3 is an isometric view of the pipe plug in its final sealing position within a pipe having a bleed port.
Figure 4:
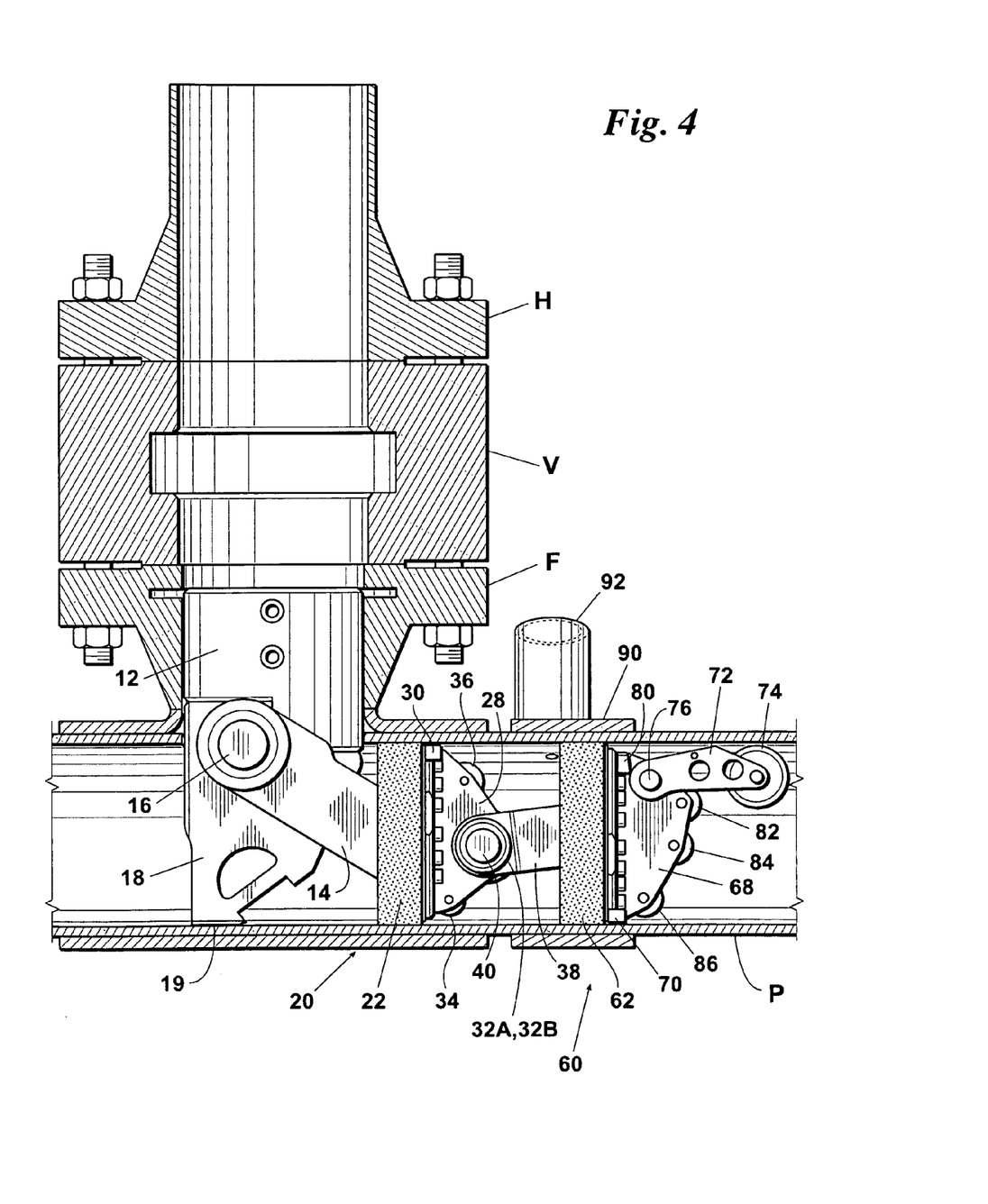
FIG. 4 is a view of the pipe plug in its final sealing position within a pipe.

Referring now to FIGS. 3 and 4, pipe plug 10 travels downwardly through an access connection—typically comprised of a housing H, sandwich valve V, and fitting F—until the bottom surface 19 of yoke mount 18 comes to rest on a bottom portion of the pipe P, with plugging head 20 and plugging head 60 substantially aligned with each other and sealing elements 22 and 62 in their final sealing position. When sealing element 22 is in its final sealing position, its outer surface of sealing element is engaged with the inner wall of pipe P and wheels 32A, 32B, and 34, as well as guide wheel 36, do not impinge on any portion of the pipe P. In this position, sealing element 22 prevents flow of product in the pipe P. When sealing element 62 is in its final sealing position, its outer surface is engaged with the inner wall of pipe P and wheels 82, 84, and 86 do not impinge on any portion of the pipe P. Pivot arm 72 and pivot arm wheel 74 are held in an outward-facing position against the pipe P by spring 78.

Sealing element 62 captures any leakage past sealing element 22 and forces that leakage out through a bleed hole or opening 94 and into fitting 92. Fitting 92 may be connected to a sleeve 90 welded around the pipe and located downstream of the pipe P access connection. Fitting 92 is of the type well-known in the art to provide a bleed port.

Figure 5:
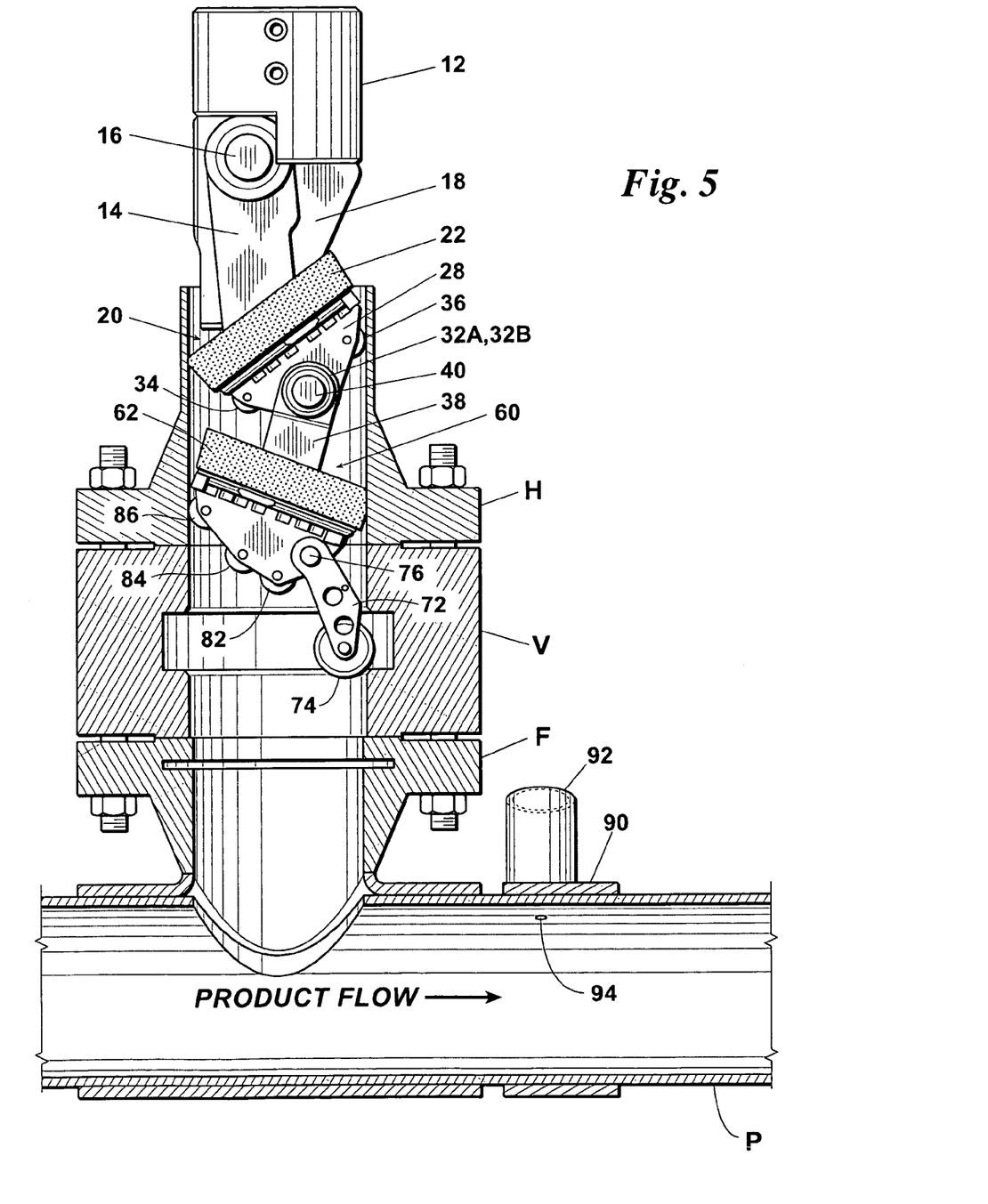
FIG. 5 is a view of the pipe plug as it is being lowered through a pipe access connection.
Figure 6:
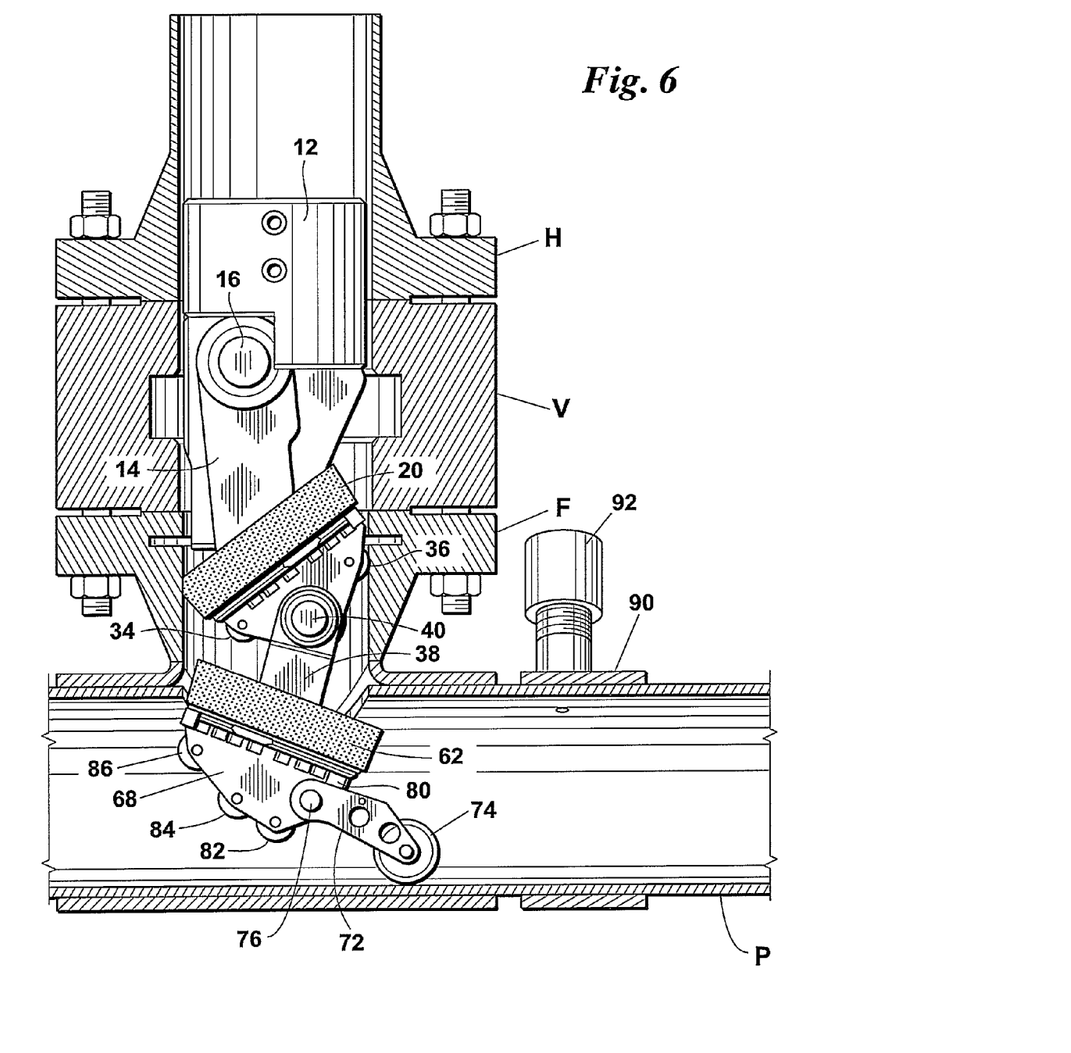
FIG. 6 is a view of the pipe plug as it begins its transition into the pipe.
Figure 7:
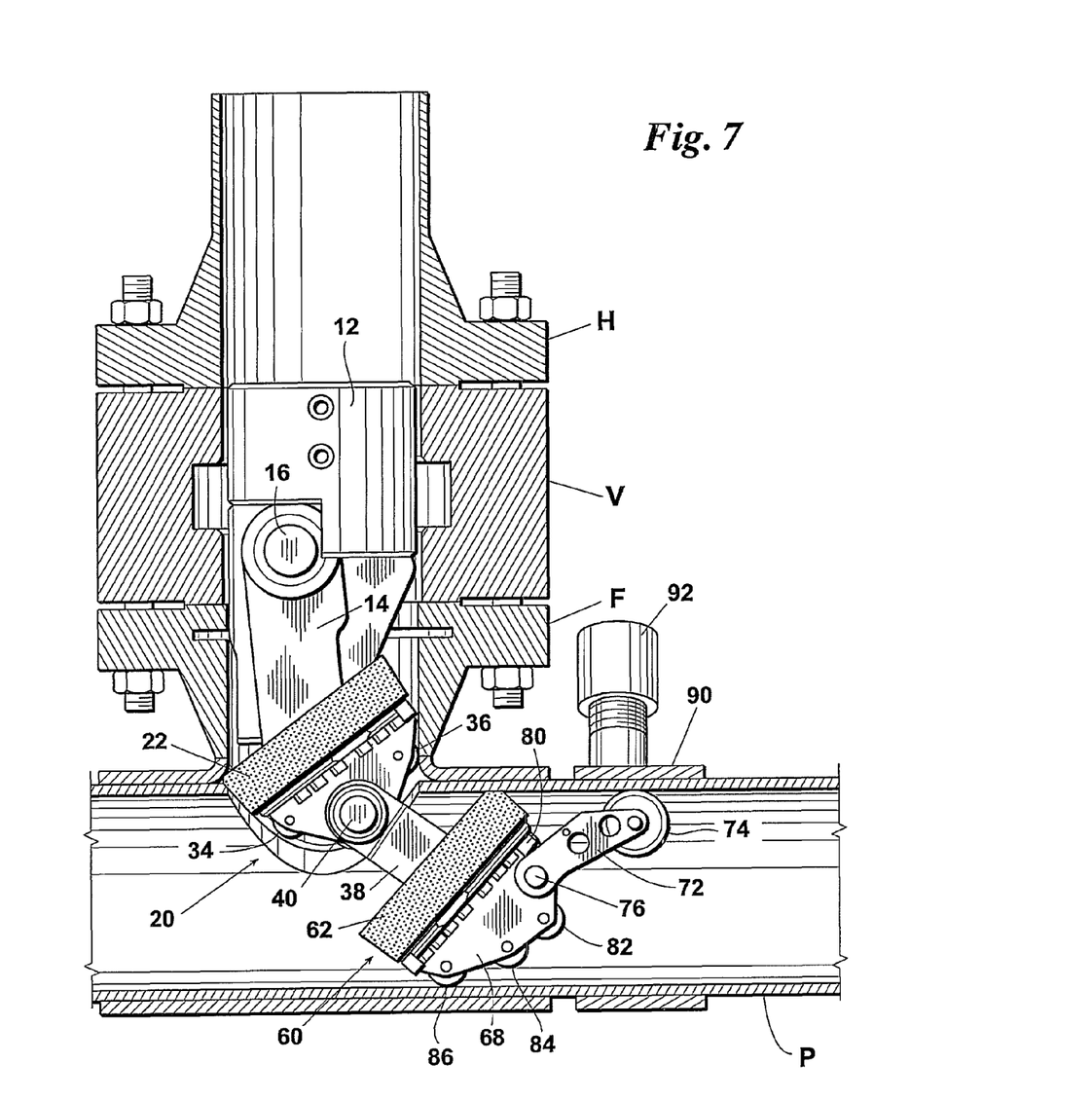
FIG. 7 is a view of the pipe plug as it travels along the pipe.
Figure 8:
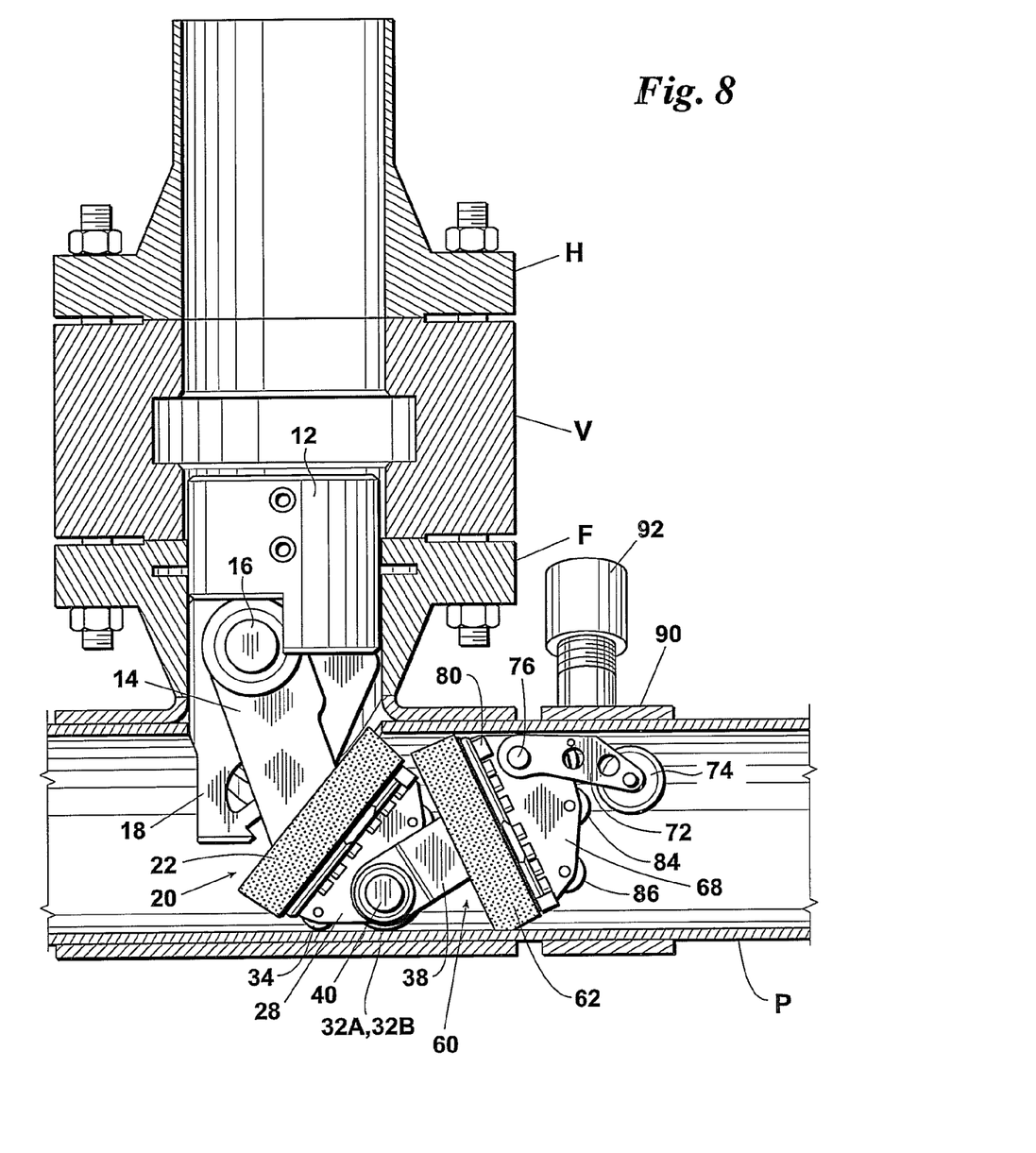
FIG. 8 is a view of the pipe plug as its plugging heads and their sealing elements begin to rotate into a final sealing position within the pipe

As illustrated by FIGS. 5 and 6, pipe plug 10 travels downwardly through housing H, sandwich valve V, and fitting F, until pivot arm wheel 74 impinges on a bottom portion of pipe P, causing yoke 38 to begin rotation about yoke pin 40. As pipe plug 10 is further lowered into the fitting, yoke 38 continues to rotate about yoke pin 40 until wheel 82 impinges a bottom portion of pipe P. As illustrated by FIG. 7, the rotation of yoke 38 continues until wheel 84 and then wheel 86 impinge on a bottom portion of the pipe. As wheel 86 impinges on a bottom portion of the pipe P, plugging head 20 begins its entry into pipe P. As illustrated by FIGS. 7 and 8, at some point in this process of rotating plugging head 60, pivot arm wheel 74 impinges on a top portion of pipe P and causes pivot arm 72 to rotate out of the way.

Referring once again to FIG. 8, as plugging head 60 becomes substantially in alignment with the inside diameter of pipe P, pipe plug 10 continues its downward travel and plugging head 20 begins its transition into position within pipe P as wheels 32A and 32B impinge on a bottom portion of pipe P, causing yoke 14 to rotate about yoke pin 16. As yoke 14 continues to rotate, plugging head 20 becomes more substantially in alignment with the inside diameter of pipe P. Wheel 34 then impinges on a bottom portion of pipe P, causing yoke 14 to continue its rotation until sealing element 22 rotates into a final sealing position. When yoke mount 18 comes to rest on a bottom portion of pipe P, sealing elements 22 and 62 are in their final sealing positions (see FIGS. 3 and 4) and pipe plug 10 is stable and capable of resisting pipeline pressure loads.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A pipe plug for plugging the interior cylindrical surface of a pipeline, the pipeline having a radially extending cylindrical opening, the pipe plug comprising:
    a carrier longitudinally extendable through said cylindrical opening and into said pipeline;
    a first plugging head having an elastomeric sealing element with a circumferential sealing surface and being pivotally connected to said carrier and extendable at a right angle thereto;
    a second plugging head having an elastomeric sealing element with a circumferential sealing surface and being pivotally connected to said first plugging head and extendable at a right angle to said carrier and in axial alignment with said first plugging head, said elastomeric sealing elements being configured to sealably engage the internal circumferential surface of the pipeline; and
    a spring biased pivot arm extending forward of said second plugging head and serving to pivotally engage said pipeline interior cylindrical surface and guide said second plugging head as the pipe plug is inserted through said cylindrical opening and into the pipeline.

2. A pipe plug according to claim 1 wherein said pivot arm has at least one outward-facing raised tapered projections.

3. A pipe plug according to claim 1 wherein said pivot arm further has at least one pivot wheel and at least one pivot arm stop.

4. A pipe plug according to claim 1 wherein said first plugging head has at least one guide wheel.

5. A pipe plug according to claim 1 wherein said first plugging head has a stabilization pad.

6. A pipe plug according to claim 1 wherein said second plugging head has a stabilization pad.

7. A pipe plug according to claim 1 wherein said first plugging head has at least one first plugging head wheel that impinges on a bottom portion of the pipeline.

8. A pipe plug according to claim 1 wherein said second plugging head has at least one wheel that impinges on a bottom portion of the pipeline.

* * * * *